United States Patent
Haswell et al.

(10) Patent No.: US 10,063,649 B2
(45) Date of Patent: Aug. 28, 2018

(54) DATA TRANSLATION USING A PROXY SERVICE

(71) Applicant: CA, Inc., New York, NY (US)

(72) Inventors: Josiah Daniel Haswell, Fort Collins, CO (US); James David Hunter, Fort Collins, CO (US)

(73) Assignee: CA, Inc., New York, NY (US)

( * ) Notice: Subject to any disclaimer, the term of this patent is extended or adjusted under 35 U.S.C. 154(b) by 261 days.

(21) Appl. No.: 14/982,769

(22) Filed: Dec. 29, 2015

(65) Prior Publication Data

US 2017/0187818 A1    Jun. 29, 2017

(51) Int. Cl.
*G06F 15/16*    (2006.01)
*H04L 29/08*    (2006.01)
*H04L 12/24*    (2006.01)

(52) U.S. Cl.
CPC ...... *H04L 67/2823* (2013.01); *H04L 41/0226* (2013.01); *H04L 67/16* (2013.01)

(58) Field of Classification Search
CPC .. H04L 67/2823; H04L 41/0226; H04L 67/16
USPC ........................................................ 709/223
See application file for complete search history.

(56) References Cited

U.S. PATENT DOCUMENTS

| | | | |
|---|---|---|---|
| 7,130,898 B2* | 10/2006 | Carter | H04L 67/16 709/223 |
| 7,380,008 B2* | 5/2008 | Teng | G06F 21/41 707/E17.005 |
| 7,448,047 B2* | 11/2008 | Poole | G06F 9/4425 707/999.1 |
| 7,490,331 B2* | 2/2009 | Beisiegel | G06F 8/30 707/999.1 |
| 7,546,462 B2* | 6/2009 | Upton | G06F 9/541 713/170 |
| 7,653,008 B2* | 1/2010 | Patrick | H04L 67/14 370/254 |
| 7,665,064 B2* | 2/2010 | Able | G06F 17/30861 717/117 |
| 7,698,398 B1* | 4/2010 | Lai | G06F 8/10 709/223 |
| 7,917,890 B2* | 3/2011 | Barcellona | G06F 8/10 717/106 |
| 8,060,553 B2* | 11/2011 | Mamou | G06F 17/30563 709/203 |
| 8,069,435 B1* | 11/2011 | Lai | G06Q 10/10 717/106 |

(Continued)

OTHER PUBLICATIONS

Microsoft, "Creating the Web Service Proxy", https://msdn.microsoft.com/en-us/library/ms155134.aspx (as visited Jan. 6, 2016), Jun. 1, 2015, 4 pages.

(Continued)

*Primary Examiner* — Melvin H Pollack
(74) *Attorney, Agent, or Firm* — Gilliam IP PLLC

(57) ABSTRACT

A proxy service receives first data from a source component. The first data is encoded in accordance with a first encoding technique. It is determined whether the first data is valid. In response to a determination that the first data is valid, the proxy service generates second data based, at least in part, on the first data and sends the second data to the target component. The second data is encoded in accordance with a second encoding technique.

20 Claims, 8 Drawing Sheets

(56) References Cited

U.S. PATENT DOCUMENTS

| | | | | |
|---|---|---|---|---|
| 8,595,197 B2* | 11/2013 | George | H04L 67/16 | 707/693 |
| 8,650,320 B1* | 2/2014 | Merrick | H04L 69/18 | 370/465 |
| 8,688,972 B2* | 4/2014 | Patrick | H04L 29/0602 | 713/153 |
| 8,775,649 B2* | 7/2014 | Blaukopf | G06F 8/00 | 709/203 |
| 8,804,767 B2* | 8/2014 | Hasek | H04N 7/17318 | 370/485 |
| 8,843,997 B1* | 9/2014 | Hare | H04L 63/0281 | 709/200 |
| 8,849,759 B2* | 9/2014 | Bestler | G06F 17/30197 | 707/638 |
| 8,869,170 B2* | 10/2014 | Sarferaz | G06Q 10/10 | 719/315 |
| 9,098,830 B2* | 8/2015 | Sarferaz | G06Q 10/10 | |
| 9,237,425 B2* | 1/2016 | Vins | G06Q 10/10 | |
| 9,261,950 B2* | 2/2016 | Gu | G06F 3/01 | |
| 9,367,826 B2* | 6/2016 | Buecheler | G06Q 10/067 | |
| 9,374,437 B2* | 6/2016 | Tussing | H04L 67/2819 | |
| 9,400,998 B2* | 7/2016 | Albers | G06Q 10/067 | |
| 9,444,785 B2* | 9/2016 | Jungck | H04L 29/12066 | |
| 9,450,836 B2* | 9/2016 | Hammer | H04L 41/50 | |
| 9,535,663 B2* | 1/2017 | Yaseen | | |
| 9,584,509 B2* | 2/2017 | Hamburg | G06F 21/335 | |
| 9,679,332 B2* | 6/2017 | Kim | G06Q 30/0643 | |
| 9,712,486 B2* | 7/2017 | Johnson | G06F 8/60 | |
| 9,769,034 B2* | 9/2017 | Ravindran | H04L 41/5058 | |
| 9,787,551 B2* | 10/2017 | Newton | H04L 41/5041 | |
| 9,819,554 B2* | 11/2017 | Varney | H04L 41/50 | |
| 9,887,885 B2* | 2/2018 | Varney | H04L 41/50 | |
| 9,892,206 B2* | 2/2018 | Levy | G06F 17/30908 | |
| 9,894,049 B2* | 2/2018 | Sample | H04L 63/08 | |
| 9,904,579 B2* | 2/2018 | Shear | G06F 9/50 | |
| 9,923,890 B2* | 3/2018 | Hamburg | H04L 63/0853 | |
| 2005/0251527 A1* | 11/2005 | Phillips | G06Q 10/06 | |
| 2006/0031432 A1* | 2/2006 | Patrick | G06F 9/546 | 709/220 |
| 2006/0031481 A1* | 2/2006 | Patrick | G06F 11/0772 | 709/224 |
| 2006/0159077 A1* | 7/2006 | Vanecek, Jr. | G06F 8/30 | 370/360 |
| 2008/0140857 A1* | 6/2008 | Conner | G06Q 10/00 | 709/236 |
| 2014/0229595 A1* | 8/2014 | Burke | H04L 41/0893 | 709/223 |
| 2014/0279670 A1* | 9/2014 | Wagner | G06Q 10/107 | 705/342 |
| 2014/0280545 A1* | 9/2014 | Wagner | G06F 8/20 | 709/204 |
| 2016/0239275 A1* | 8/2016 | Singh | G06F 8/41 | |
| 2016/0359574 A1* | 12/2016 | Lee | H04H 20/95 | |
| 2017/0118037 A1* | 4/2017 | Kitchen | H04L 12/2818 | |
| 2018/0096752 A1* | 4/2018 | Ovalle | H01L 31/02246 | |

OTHER PUBLICATIONS

Mulesoft, "Web Service Proxy Pattern", https://docs.mulesoft.com/mule-user-guide/v/3.6/web-service-proxy-pattern (as visited Jan. 6, 2016), Jun. 1, 2015, 12 pages.

* cited by examiner

DATA TRANSLATION USING A PROXY SERVICE

BACKGROUND

The disclosure generally relates to the field of computing systems, and more particularly to computing system services.

In the computing context, a service is typically a component that facilitates one or more related functions. For example, a service may facilitate the management of users by allowing other components to add, delete, or update users. As another example, a service may facilitate authentication by verifying (i.e., authenticating) a particular username and password. Although a service can be implemented to allow direct interaction with the service (e.g., via function calls), services are typically characterized in terms of access to components separate from the service. For example, a service may be implemented to communicate with other components via inter-process messages, over a network via Representational State Transfer (REST) messages, etc. Requests and responses between a service and other components can conform to specific formats which may be defined by an Application Programming Interface (API).

BRIEF DESCRIPTION OF THE DRAWINGS

Aspects of the disclosure may be better understood by referencing the accompanying drawings.

DESCRIPTION

Figure 1:
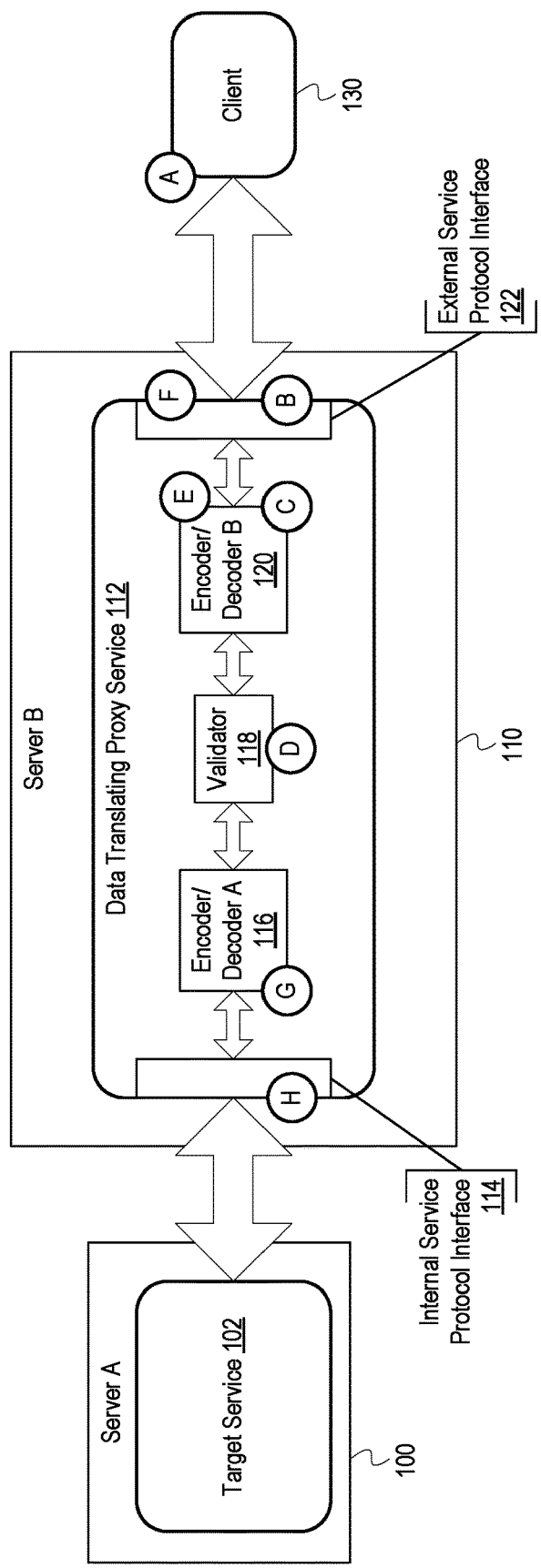
FIG. 1 depicts the operation of an example data translating proxy service for translating between different data encoding formats.

The description that follows includes example systems, methods, techniques, and program flows that embody aspects of the disclosure. However, it is understood that this disclosure may be practiced without these specific details. For instance, this disclosure refers to REST-based services in illustrative examples. But aspects of this disclosure can be applied to other service paradigms as well. In other instances, well-known instruction instances, protocols, structures and techniques have not been shown in detail in order not to obfuscate the description.

Data transmitted between a component and a service may be encoded according to a particular format (typically specified as part of the service definition/API). Encoding the data allows the data and relationships between the data to be transmitted as a stream of bits (e.g., serialized). For example, an API might specify that data received will be interpreted as a series of ASCII characters, that semicolon characters delimit variable definitions, and that colons delimit variable types, variable names, and variable values. Thus, a service might receive data from another component as a sequence of bits (e.g., "0110011001101111 . . . "), which are translated into the ASCII characters "1:foo1:bar1;1:foo2:bar2". Based on the defined delimiters, the service can then determine that the ASCII characters specify two variables, 'foo1' and 'foo2', which have the values 'bar1' and 'bar2', respectively. The initial '1' represents the type; in this example, '1' corresponds to a "string" type.

Different encoding techniques can be designed for, and used in, varying scenarios. For example, a general purpose service may utilize a common encoding technique, such as JavaScript® Object Notation (JSON) or eXtensible Markup Language (XML), to reduce the amount of effort involved in developing a component that uses the service. A more specialized service may utilize a "bespoke", or custom, encoding technique unique to the particular service. Utilizing a custom encoding technique can allow a service designer to increase the performance of a service by removing unnecessary features from the encoding technique. The increase in performance generally comes at the expense of compatibility, since prefabricated libraries may not be available to handle data encoded using a custom encoding technique.

While the examples described herein are not limited to any particular set of encoding techniques, illustrating the potential difference between encoding techniques may be useful. Consider, for example, a data object (hereinafter "object") that includes three attributes, a first name, a last name, and a phone number. A JSON-encoded representation of the object may be the following:

```
{
    "firstName": "John",
    "lastName": "Doe",
    "phoneNum": "555-555-5555"
}
```

Because each attribute is identified by a name (e.g., "firstName"), the order in which the attributes appear is not fixed. Further, each attribute value is encapsulated by quotation marks, identifying each attribute value as a "string" data type. However, by restricting the order and data types of the object, the amount of data used to represent the object may be minimized. For example, the following encoding may be used to represent the same object:

{John,Doe,5555555555}

By restricting the order such that the first attribute is always the first name, the second attribute is always the last name, and the third attribute is always a ten digit phone number, the corresponding attribute names can be removed from the encoded representation of the object. Similarly, by restricting each attribute to a particular data type, the encoding need not include an indication of the data type (e.g., the quotation marks). Thus, a "custom" encoding of the object can reduce the amount of data used by the encoding by one-third (or more, if whitespace is not ignored). Further, the operations performed by a receiving entity to recreate the object are reduced. For example, because attribute order is not restricted in the case of the JSON-encoded representation, a receiving entity may have to compare each of the attribute names to identify a particular attribute. Because the attribute order is restricted in the "custom" encoding, attributes can be identified solely based on their position in the encoding, which may result in a lower computational load than comparing text values. Many different techniques can be used to encode data and the above encoding techniques are merely examples of some of the possible techniques.

Serialization techniques can be used in conjunction with encoding techniques to facilitate data transfer. A serialization technique utilizes an encoding technique (which may include a particular format definition, such as JSON) to convert an entity (e.g., an object) into a sequence of bits suitable for transmission (e.g., over a network) or storage (e.g., on a storage device). Although serialization techniques can be independent of encoding techniques, the term "encoding technique", as used herein, refers to serialization techniques, encoding techniques, or any combination thereof, including multiple encoding and/or serialization techniques. Additionally, the term "high performance encoding (or serialization) technique" refers to any encoding technique that results in lower computational load, decreases the amount data transferred, or otherwise results in increased performance over a different encoding technique.

Generally, a service is not limited to a single encoding technique. Instead, a service can implement interfaces compatible with multiple encoding techniques, thus increasing the compatibility of the service. However, implementing an interface that is compatible with a lower performance encoding technique may reduce the performance of the service generally, resulting in lower performance for an interface that uses a high performance encoding technique. For example, processing data encoded using a first encoding technique may take twice as many processor cycles as processing data encoded using a second encoding technique, as described above. Thus, the service may spend additional time decoding or encoding data when data using the first encoding technique is received, delaying processing of other data.

To reduce the impact of supporting lower performance encoding techniques, a target service can operate in conjunction with a proxy service. The target service conforms to a particular service definition and implements an interface that sends and receives data using a first encoding technique. The proxy service conforms to the same service definition as the target service, but implements two interfaces, a first interface that sends and receives data using the first encoding technique and a second interface that sends and receives data using a second encoding technique. Further, the proxy service does not include the same functionality as the target service. Instead, the proxy service translates data between the first encoding technique and the second encoding technique. For example, when the proxy service receives data at the first interface, the proxy service translates the data from data encoded using the first encoding technique to data encoded using the second encoding technique, then sends the data using the second interface to a client. Similarly, when the proxy service receives data at the second interface, the proxy service translates the data from data encoded using the second encoding technique to data encoded using the first encoding technique, then sends the data using the first interface to the target service.

The proxy service may implement a subset of the functionality of the target service, such as validation and authentication/authorization. For example, because the proxy service conforms to the same service definition as the target service, the proxy service can validate whether data received conforms to the service definition. As another example, the proxy service may determine whether the source of the received data is authorized to use the target service.

Because the proxy service translates the data using the first encoding technique to and/or from data using the second encoding technique, the proxy service reduces the computational load of the target service, improving the general performance of the target service. Further, when the proxy service implements functionality to perform validation of the data and/or data source, the proxy service further reduces the computational load of the target service.

Because the proxy service can be implemented separately from the target service itself, the proxy service can use computing resources independent from computing resources used by the target service. For example, the target service may run on a first server while the proxy service itself runs on a second server. Thus, the computing resources of the first server can be dedicated to encoding and decoding communications that use the more efficient, first encoding technique without encoding/decoding communications that use the less efficient, second encoding technique. Even when not using independent computing resources, use of the proxy service can still improve the performance of the target service by executing as a separate process and, in some implementations, utilizing priority settings.

FIG. 1 depicts the operation of an example data translating proxy service for translating between different data encoding formats. FIG. 1 depicts server A 100, server B 110, and a client 130. Server A 100 includes a target service 102. Server B 110 includes a data translating proxy service 112 (hereinafter "proxy service 112"). The proxy service 112 includes an internal service protocol interface 114, encoder/decoder A 116, a validator 118, encoder/decoder B 120, and an external service protocol interface 122. Encoder/decoder A 116 encodes and decodes data using a high performance encoding technique (hereinafter "encoding technique A"). Encoder/decoder B 120 encodes and decodes data using a second encoding technique (hereinafter "encoding technique B").

Communications between the target service 102, the proxy service 112, and the client 130 conform to a particular service definition. For example, the target service 102 and the proxy service 112 may implement a particular API, which serves as the service definition for the target service 102 and the proxy service 112. Thus, to an entity interacting with the proxy service 112 (e.g., the client 130), the proxy service 112 appears to be a full-fledged service (like the target service 102).

At stage A, the client 130 generates and sends a request to the proxy service 112. The request conforms to a service definition implemented by the target service 102 and the proxy service 112 and is encoded using encoding technique B. The request can vary. For example, the request may be a connection request, a request for service-related data, or a request to perform a particular operation.

At stage B, the external service protocol interface 122 receives the request from the client 130. The external service protocol interface 122 includes any components and/or functionality that receives the request from the client 130 and prepares the request to be used by the proxy service 112. For example, the request may be sent over a network. Various components of a network stack on the client 130 (not depicted) may encode the request for transmission over the network. Various components of a network stack of the external service protocol interface 122 may decode the request received over the network. Such encoding and decoding (e.g., network layer encoding/decoding) is performed in addition to encoding and decoding used for encoding technique B (e.g., application layer encoding/decoding). Once the external service protocol interface 122 prepares the request for use by the proxy service 112, the external service protocol interface 122 provides the request to encoder/decoder B 120.

At stage C, encoder/decoder B 120 receives the request from the external service protocol interface 122 and decodes the request. In particular, the request received by encoder/decoder B 120 is encoded in accordance with encoding technique B. Encoder/decoder B 120 thus decodes the request into a native format used by the proxy service 112. The particular technique used to decode the request can vary. For example, if encoding technique B applies a SOAP compliant protocol, encoder/decoder B 120 may receive the request as an HTTP message. The encoder/decoder B 120 may analyze the headers and payload of the received HTTP message to determine the particular contents of the request.

At stage D, the validator 118 validates the request. The particular operations performed to validate the request can vary. For example, the validator 118 may identify a service based on a service identifier specified by the request. The service identifier may be translated/mapped to an internal service identifier that identifies the target service 102. The validator 118 can determine whether the internal service identifier references a valid service (e.g., determine whether target service 102 exists). The validator 118 may also validate other aspects of the request. For example, if the request specifies a particular operation and associated parameters, the validator 118 may determine whether the operation is a valid operation and whether the parameters are valid parameters. In some implementations, the validator 118 may authenticate the client 130 and/or determine whether the client 130 has permission to access the target service 102 and/or perform any operations specified by the request.

If the validator 118 determines that the request is not valid, the validator 118 generates an error response and sends the error response to encoder/decoder B 120. The operations described below at stages E and F are then performed. If the validator 118 determines that the request is valid, the validator 118 passes the request to encoder/decoder A 116. The operations described below at stages G and H are then performed.

At stage E, encoder/decoder B 120 encodes the error response generated by, and received from, the validator 118 in accordance with encoding technique B. The particular operations performed to encode the data can vary based on the data itself, the format, etc. For example, encoding technique B may specify that the data is encoded in a base64 format with particular headers appended to the data. As another example, encoding technique B may specify that messages are encoded as an HTTP message. Once the encoder/decoder B 120 has encoded the error response, encoder/decoder B 120 provides the encoded error response to the external service protocol interface 122.

At stage F, the external service protocol interface 122 receives the encoded error response and sends the encoded error response to the client 130. Prior to sending the encoded error response, the external service protocol interface 122 may perform additional operations to the encoded error response. For example, the external service protocol interface 122 may convert the encoded error response into one or more Transmission Control Protocol packets, which may in turn be converted into one or more Ethernet packets. The external service protocol interface 122 may then send the encoded error response to the client 130 via a network.

If the validator 118 determined that the request is valid at stage D, the validator provides the request to encoder/decoder A 116 and the operations at stages G and H are performed.

At stage G, encoder/decoder A 116 receives the request from the validator 118 and encodes the request in accordance with encoding technique A. The particular operations performed by encoder/decoder A 116 can vary depending on the request, the specification of encoding technique B, etc. Generally, the functionality of encoder/decoder A 116 is similar to that of encoder/decoder B 120, but the operations performed by encoder/decoder A 116 are directed to encoding and/or decoding data in accordance with encoding technique A instead of encoding technique B. After encoder/decoder A 116 encodes the request in accordance with encoding technique A, encoder/decoder A 116 provides the encoded request to the internal service protocol interface 114.

At stage H, the internal service protocol interface 114 receives the encoded request and sends the encoded request to the target service 102. Prior to sending the encoded request, the internal service protocol interface 114 may perform additional operations to the encoded request. For example, the internal service protocol interface 114 may convert the encoded request into one or more Transmission Control Protocol packets, which may in turn be converted into one or more Ethernet packets. The internal service protocol interface 114 may then send the encoded request to the target service 102 via a network.

The proxy service 112 functions in a similar manner when data is sent from the target service 102 to the client 130. For example, the target service 102 may send a response to the request sent by the client at stage A. The internal service protocol interface 114 receives the response from the target service 102 and provides the response to encoder/decoder A 116 (similar to the operations performed at stages B and C, above). Encoder/decoder A 116 can decode the response from encoding technique A and provide the decoded response to the validator 118 (similar to some of the operations performed at stage C, above). In some implementations, data from some sources may bypass the validator 118 (e.g., a response from a "trusted" source, such as the target service 102, may be assumed to conform to the service definition). If provided to the validator 118, the response can be validated similar to validating the request at stage D. The validator 118 can provide the response to encoder/decoder B 120, which can encode the response in accordance with encoding technique B and provide the encoded response to the external service protocol interface 122 (similar to the operations performed at stages G and H, above). The external service protocol interface 122 can send the encoded response to the client 130 (similar to the operations performed at stage H, above). Similar operations can be performed for messages sent between the target service 102 and the client 130, regardless of the type of message or which component is the source of the message.

The proxy service 112 is not limited to translating between two encoding techniques (e.g., encoding technique A and encoding technique B). For example, the proxy service 112 may be coupled with multiple target services (and conform to multiple corresponding service definitions). If each target service uses a different encoding technique, the proxy service 112 may include an encoder/decoder that corresponds to each of the encoding techniques. As another example, the external service protocol interface 122 may accept data encoded using either JSON or XML and the proxy service 112 may include an encoder/decoder for both JSON and XML. Similarly, the proxy service 112 may accept data transmitted using multiple service paradigms at a single interface. For example, the external service protocol interface 122 may be compatible with REST-based communications and Simple Object Access Protocol (SOAP))-based communications.

The example depicted in FIG. 1 describes the encoder/decoders as decoding data into transitional data (i.e., a transitional format) prior to validating the data then re-encoding the data using a different encoding technique. In some implementations, decoding data to a transitional format then re-encoding the data may not be done. For example, one or both of the encoding techniques used may be compatible with a direct translation to the other encoding technique and the validator 118 may be capable of validating encoded data directly. For example, consider the example encoding techniques described above. The validator 118 might be implemented such that it can read JSON-encoded data directly, thus allowing the validator 118 to validate the JSON-encoded data directly. Similarly, encoder/decoder A 116 may also be capable of reading JSON-encoded directly, allowing the encoder/decoder A 116 to read the attribute values directly from the JSON-encoded data instead of requiring data in a transitional format.

Although the target service 102 and the proxy service 112 are depicted as being located on two different servers (server A 100 and server B 110, respectively), the target service 102 and proxy service 112 can be located on the same hardware. For example, the target service 102 and the proxy service 112 may be executed on different virtual machines or as separate processes on the same server. In particular, use of the proxy service 112 can facilitate horizontal scalability even if the proxy service 112 uses the same computational resources as the target service 102. For example, assume that the target service 102 performs the translation and validation itself. If multiple instances of the target service 102 are created (e.g., horizontally scaled to separate servers), each instance includes the translation and validation functionality of the proxy service 112. However, use of the proxy service 112 means that the target service 102 can be horizontally scaled separately from the functionality of the proxy service 112. Thus, instead of having n instances of the target service 102 that include the same proxy service 112 functionality, none of the n instances of the target service 102 will include the functionality of the proxy service 112, resulting in smaller and more efficient instances.

The example depicted in FIG. 1 utilizes the proxy service 112 as a gateway between an internal network (which includes server A 100) and an external network (which includes client 130). However, the proxy service 112 can be used within a network as well. For example, the client 130 may be a client on the same network as server A 100 and server B 110. Additionally, some implementations may have a single service protocol interface instead of separate service protocol interfaces (e.g., an internal service protocol interface 114 and an external service protocol interface 122, or may have service protocol interfaces that share some components (e.g., a network interface).

In some implementations, the proxy service 112 may implement a subset of the functionality of the target service 102. For example, an API implemented by the target service 102 may define multiple sets of operations, with some operations being restricted to a particular subset of clients (e.g., clients internal to a particular organization) and others being available to all clients (e.g., clients internal and external to the particular organization). The proxy service 112 might implement operations available to both internal and external clients, but not implement operations available only to internal clients.

The proxy service 112 is not limited to translating data between two encoding techniques that have different computational loads. In particular, the proxy service 112 can also act to increase compatibility of the target service 102 without increasing the complexity of the target service 102 (e.g., by supporting multiple encoding techniques).

Figure 2:
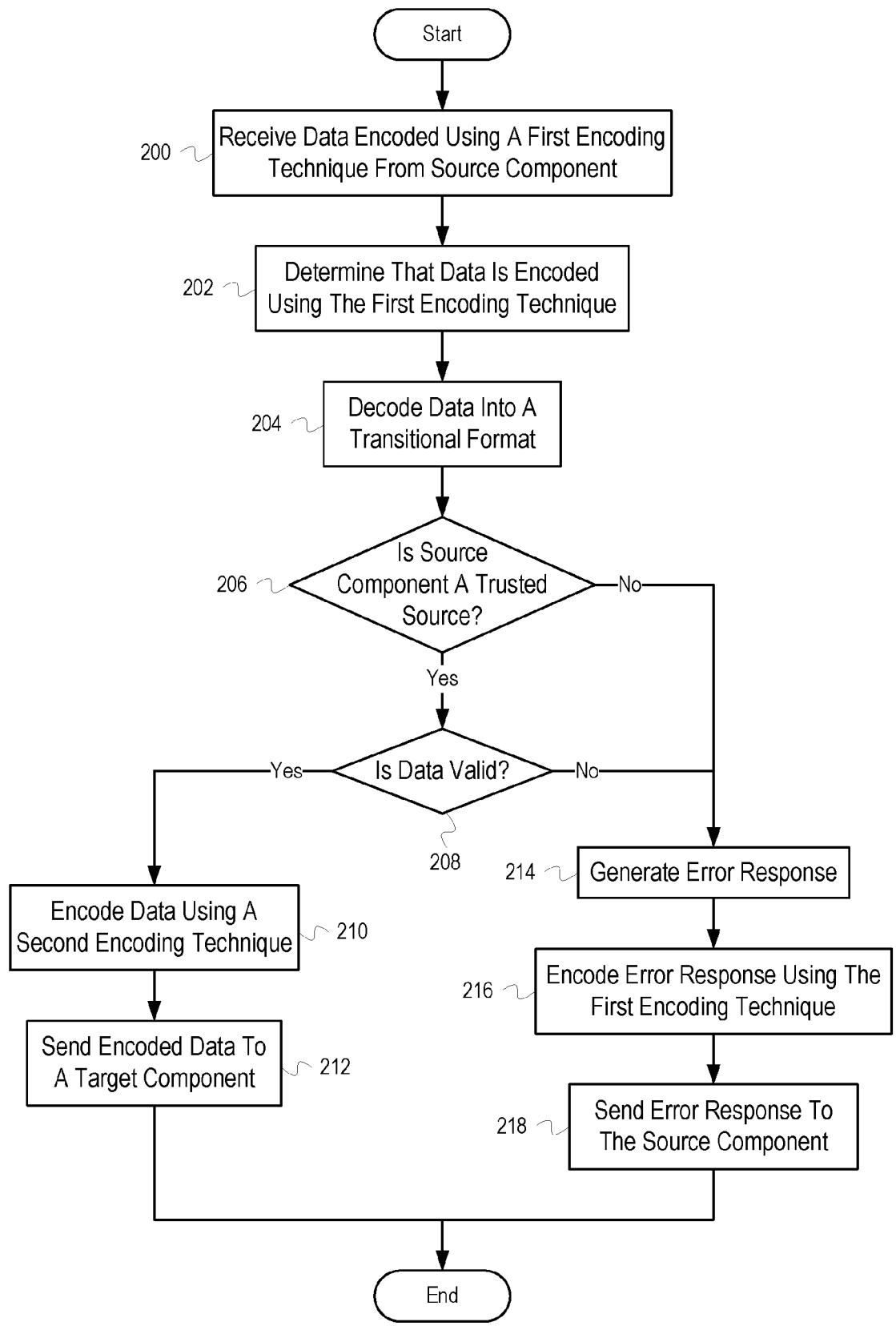
FIG. 2 depicts a flowchart of example operations for translating data encoded using a first encoding technique to data encoded using a second encoding technique.

FIG. 2 depicts a flowchart of example operations for translating data encoded using a first encoding technique to data encoded using a second encoding technique. The operations depicted in FIG. 2 can be performed by a proxy service, such as the proxy service 112 of FIG. 1, or any suitable component.

Initially, a proxy service receives data encoded using a first encoding technique from a source component (block 200). The data can be received via a service interface, which can include components of a network stack and/or other hardware/software used to communicate with the source component. The first encoding technique can use a single encoding or serialization technique or a combination of individual encoding or serialization techniques.

After receiving the data, the proxy service determines that the data received is encoded using the first encoding technique (block 202). The particular technique used by the proxy service to determine that the data received is encoded using the first encoding technique can vary. For example, the proxy service may determine that the first encoding technique is used by virtue of the data target. For example, the proxy service may receive the data at a particular interface dedicated to receiving data encoded using the first encoding technique. As a more particular example, the proxy service may include a first interface for SOAP messages and a second interface for REST messages. The proxy service may determine that the first encoding technique is used by analyzing the data itself or metadata associated with the data. For example, the proxy service may receive the data as part of an HTTP message that includes a field identifying the data as being encoded using the first encoding technique (e.g., an Internet media type field with the value "application/json" identifies data encoded using JSON). If the proxy service includes multiple encoder/decoders (corresponding to different encoding techniques), the proxy service may also identify the particular encoder/decoder corresponding to the first encoding technique.

Once the proxy service determines that the data received is encoded using the first encoding technique, the proxy service decodes the data into a transitional format (block 204). The proxy service can decode the data into the transitional format using an encoder/decoder corresponding to the first encoding technique. The particular operations used to decode the data can vary depending on the first encoding technique.

After the data is decoded into the transitional format, the proxy service determines whether the source component is a trusted source (block 206). The proxy service can determine whether the source component is a trusted source based on metadata identifying whether the source is a trusted source, the particular encoding technique used, the service interface the data is received at, etc. For example, configuration data associated with the proxy service may identify a range of IP addresses that correspond to trusted sources. If the source component has an IP address within the range of IP addresses, the proxy service may determine that the source component is trusted. As another example, the proxy service may have a service interface available only to trusted components (e.g., within the same network). The proxy service may thus determine that any data received by that service interface is from a trusted source. If the proxy service determines that the source component is a trusted source, control flows to block 208. If the proxy service determines that the source component is not a trusted source, control flows to block 214.

If the proxy service determines that the source component is a trusted source block 206), the proxy service determines whether the data is valid (block 208). The particular operations performed to determine whether the data is valid can vary. For example, the proxy service may determine whether the data identifies a valid target (either target service or client), whether the data identifies functionality defined by a service definition implemented by the proxy service, whether any parameters included in the data conforms to the service definition, or whether the source component is authorized to perform an operation identified in the data. If the proxy service determines that the data is valid, control flows to block 210. If the proxy service determines that the data is not valid, control flows to block 214.

If the proxy service determined that the data is valid (block 208), the proxy service encodes the data using a second encoding technique (block 210). The particular operations performed to encode the data using the second encoding technique can vary depending on the second encoding technique. The second encoding technique can use a single encoding or serialization technique or a combination of multiple encoding or serialization techniques. Depending on the configuration of the proxy service, the one or more networks coupling the source component, the proxy service, and the target component, etc., the proxy service may translate a target component identifier in the data to a different target component. For example, the proxy service (or service interface that receives the data at block 200) may be identified using a particular identifier. However, the identifier that identifies the actual target component (whether a target service or target component) may differ. Thus, the proxy service may translate the target component identifier used by the source component into a different target component identifier. The translation may be performed using metadata specifying mappings between target components, querying a data source (such as a name server or database), or performing one or more transformations to the target component identifier itself.

After the proxy service encodes the data using the second encoding technique, the proxy service sends the encoded data to a target component (block 212). The target component can be identified in the original data received (block 200) and can be a target service, a client, or another component. The proxy service can utilize a service interface to send the encoded data. The service interface can include a network stack and/or other software/hardware used to communicate with the target component. The service interface can be the same service interface used to receive the data (block 200), can be an independent service interface from the service interface used to receive the data, or can share one or more components with the service interface used to receive the data. After sending the encoded data to the target component, the process ends.

If the proxy service determined that the source component is not a trusted source (block 206) or that the data is not valid (block 208), the proxy service generates an error response (block 214). The error response is generated based on the particular communication manner used by the source component. For example, if the source component communicates with the proxy service using a REST-based service interface, the error response is generally generated to be compatible with the REST-based communications. Similarly, if the source component communicates with the proxy service using a SOAP-based service interface, the error response is generally generated to be compatible with SOAP-based communications. Further, the error response may be compatible with the service definition implemented by the proxy service if the service definition defines error responses. In some instances, an error response may implied by not sending any response to the source component.

After generating the error response, the proxy service encodes the error response using the first encoding technique (block 216). The particular operations performed to encode the error response using the first encoding technique can vary depending on the first encoding technique. In some implementations, an alternative encoding technique may be used if requested by the source component.

After encoding the error response, the proxy service sends the encoded error response to the source component (block 218). The proxy service can send the encoded error response using the same service interface used to receive the data (block 200) or a different service interface. The service interface can include parts of a network stack and/or hardware/software used to communicate with the source component. If different from the service interface used to receive the data, the service interface may share one or more components with the service interface used to receive the data. After sending the error response, the process ends.

The operations depicted in FIG. 2 include operations that may not be performed in some implementations. For example, some implementations may only support translation between two encoding techniques, thus may not need to explicitly determine that data is encoded using a particular technique (block 202). Further, as described above, the proxy service may be capable of translating data between encoding techniques without decoding the data to a transitional format (block 204). Further, some implementations may not utilize a trusted component status to skip validation of the data (block 206) and some implementations may not validate data (block 208).

Dynamic Proxy Service Example

In some implementations, a dynamic proxy service can be used. A dynamic proxy service can dynamically identify target services as requests for the target services are received. For example, assume that a particular proxy service implements a service definition associated with Target Service A but receives a request from a client that targets Target Service B, the service definition of which the proxy service does not implement. Instead of sending an error response to the client, the proxy service can locate (i.e., "discover") Target Service B, retrieve the service definition for Target Service B, and perform the operations described above. Thus, instead of failing because the proxy service does not implement a particular service definition, the proxy service can dynamically (i.e., on demand) retrieve and implement a service definition.

Figure 3:
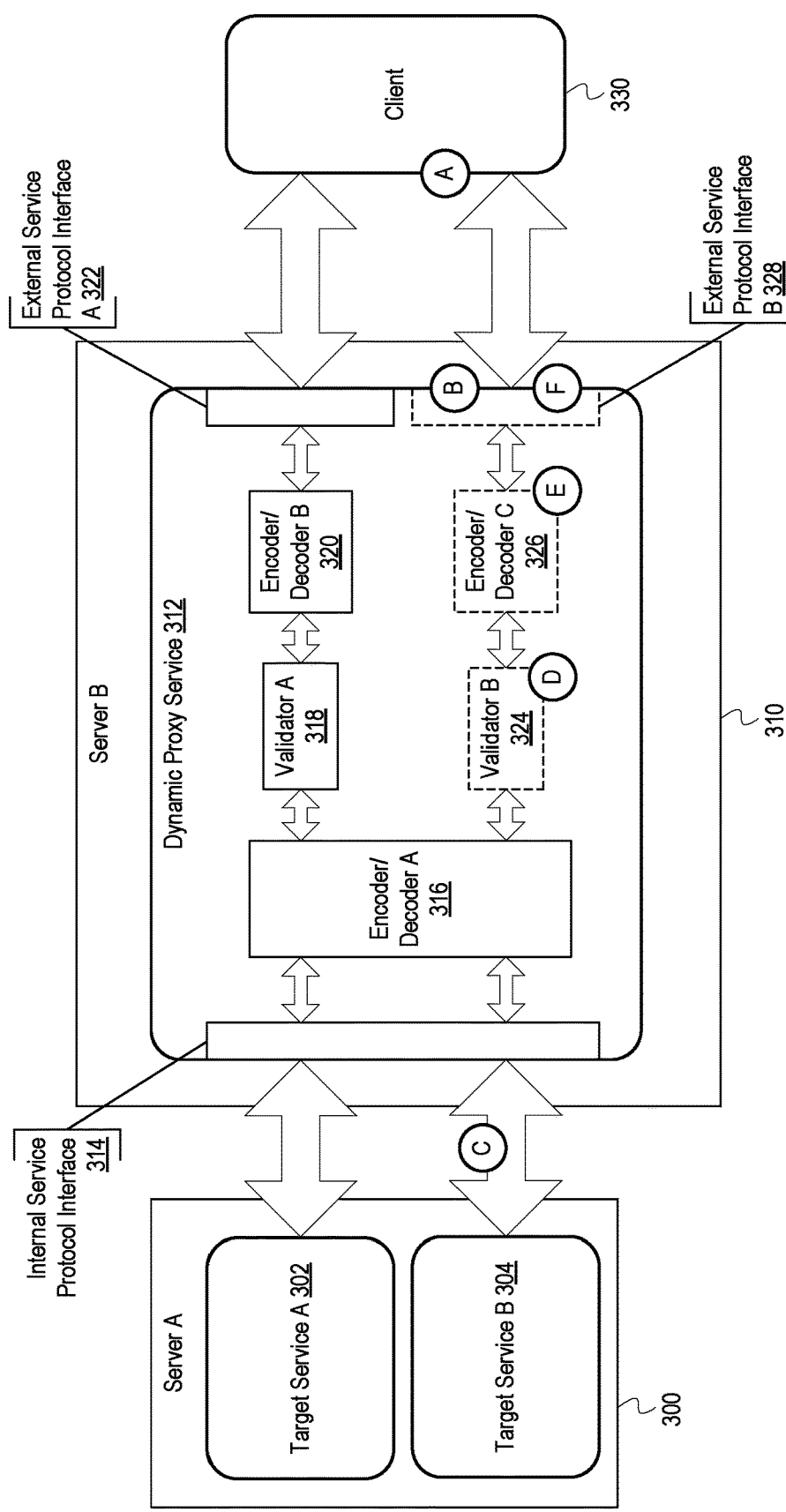
FIG. 3 depicts the example operation of a dynamic proxy service.

FIG. 3 depicts the example operation of a dynamic proxy service. FIG. 3 depicts server A 300, server B 310, and a client 330. Server A 300 includes target service A 302 and target service B 304. Server B 310 includes a dynamic proxy service 312. Initially, the dynamic proxy service includes an internal service protocol interface A 314, encoder/decoder A 316, validator A 318, encoder/decoder B 320, and external service protocol interface A 322. As indicated by the dashed lines, validator B 324, encoder/decoder C 326, and external service protocol interface B 328 are implemented at a subsequent point.

At stage A, the client 330 sends data to the dynamic proxy service 312. The data identifies (either directly in the data or in metadata associated with the data) target service B 304. The client 330 can send data using operations similar to those of stage A of FIG. 1.

At stage B, the dynamic proxy service 312 receives the data from the client and determines that no corresponding external service protocol interface exists for the data. For example, an external service protocol interface (such as external service protocol interface A 322) may be identified by the target service that the particular external service protocol interface is mimicking. The dynamic proxy service 312 can maintain metadata identifying all target services the dynamic proxy service 312 has external service protocol interfaces corresponding to. Thus, in this instance, the dynamic proxy service 312 can look for target service B 304 in the metadata and determine that no external service protocol interface exists for target service B 304.

At stage C, the dynamic proxy service 312 queries target service B 304 or related data source for the service definition associated with target service B 304. The related data source may be a database or other repository that can store service definitions. In response to the query, the dynamic proxy service 312 receives the service definition.

At stage D, the dynamic proxy service 312 instantiates a new validator B 324 that corresponds to the service definition associated with target service B 304. The particular operations performed to instantiate validator B 324 can vary depending on the implementation of the validators, the particular service definition, etc.

At stage E, the dynamic proxy service 312 instantiates a new encoder/decoder C 326 that corresponds to the service definition associated with target service B 304. In some implementations, encoder/decoder C 326 may not have a strong correspondence to the service definition. For example, the dynamic proxy service 312 might implement a REST-based encoder/decoder for each service definition that performs generic operations (e.g., not service definition specific) for encoding/decoding data. For example, encoder/decoder C 326 may be capable of converting any data received into a transitional format without performing service definition-specific operations. In some implementations, however, encoder/decoder C 326 may be perform operations that are specific to the service definition associated with target service B 304 (i.e., some or all of the operations performed by encoder/decoder C 326 may differ from those performed by encoder/decoder B 320).

At stage F, the dynamic proxy service 312 instantiates a new external service protocol interface B 328 that corresponds to the service definition associated with target service B 304. As with encoder/decoder C 326, external service protocol interface B 328 may include functionality specific to target service B 304 or may share functionality with other external service protocol interfaces.

Once the dynamic proxy service 312 has instantiated the components used to translate requests targeting target service B 304, the dynamic proxy service can perform operations as described above in relation to FIG. 1. For example, encoder/decoder C 326 may decode the data received from the client 330, validator B 324 may validate the data, encoder/decoder A 316 may encode the validated data, and internal service protocol interface 314 can send the encoded data to target service B 304.

In some instances, the dynamic proxy service 312 may determine that the data received from the client 330 is directed to an invalid target service. In such instances, the dynamic proxy service 312 can generate and send an error response to the client 330 as described above.

The dynamic proxy service 312 may have been provided with the service definition for target service A 302 when initialized or may have retrieved the service definition for target service A 302 and instantiated the associated components in response to a previous request that identified target service A 302.

The dynamic proxy service 312 is an example of a proxy service that has a single internal service protocol interface A 314 for multiple target services. Similarly, the dynamic proxy service 312 includes a single encoder/decoder (encoder/decoder A 316) for encoding and decoding data sent to/received from both target services. As described above, in some implementations, the dynamic proxy service 312 may include an internal service protocol interface that corresponds to each target service and/or an encoder/decoder that corresponds to each target service.

Figure 4:
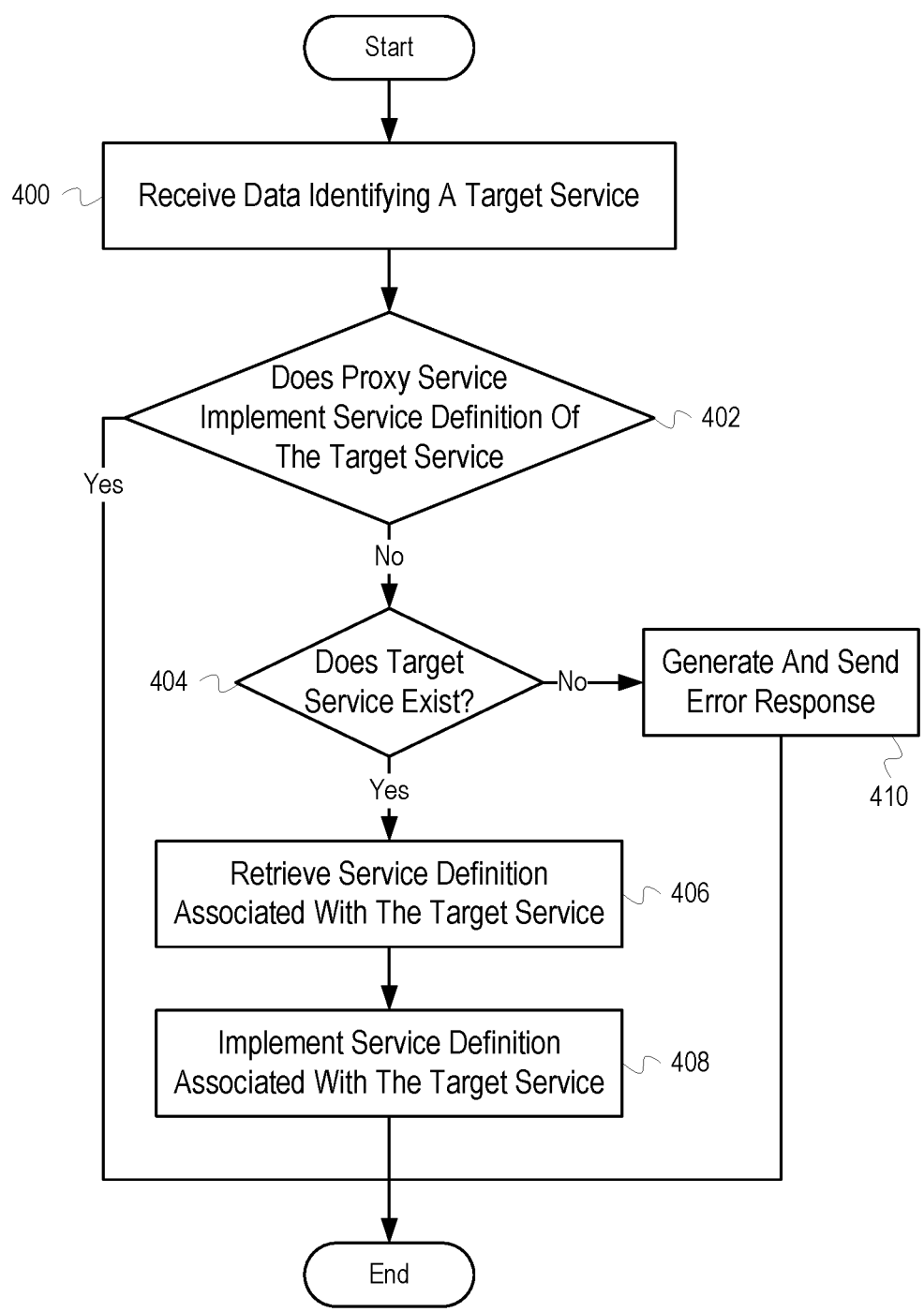
FIG. 4 depicts a flowchart of example operations for dynamically implementing a service definition.

FIG. 4 depicts a flowchart of example operations for dynamically implementing a service definition. The operations depicted in FIG. 4 can be performed by a dynamic proxy service, such as the dynamic proxy service 312 of FIG. 3, or any suitable component.

Initially, a proxy service receives data identifying a particular target service (block 400). The target service can be identified in the data itself (e.g., embedded in the data) or in metadata associated with the data. For example, if the data is received via a REST-based message, the target service may be identified via a particular Uniform Resource Locator (URL) path.

After receiving the data identifying the target service, the proxy service can determine whether the proxy service implements a service definition associated with the target service (block 402). To determine whether the proxy service implements a service definition associated with the target service, the proxy service can look up the target service in metadata identifying service definitions implemented by the proxy service. In some implementations, the proxy service can determine whether the proxy service implements a particular operation identified in the data. If the proxy service does not implement the particular operation, the proxy service can determine that the proxy service does not implement a service definition associated with the target service. If the proxy service determines that the proxy service implements the service definition associated with the target service, the process ends. If the proxy service determines that the proxy service does not implement the service definition associated with the target service, control flows to block 404.

If the proxy service does not implement the service definition associated with the target service, the proxy service determines whether the target service exists (block 404). The proxy service can determine whether the target service exists by determining whether the target service is located at an endpoint associated with the target service. The particular endpoint may be a particular server, a particular IP address, may be based on a configuration associated with the proxy service, determined via a database query using a target service identifier, etc. If the target service does exist at the corresponding endpoint, the proxy service determines that the target service does exist and control flows to block 406. If the target service does not exist at the corresponding endpoint, the proxy service determines that the target service does not exist and control flows to block 410.

If the proxy service determines that the target service does exist, the proxy service retrieves the service definition associated with the target service (block 406). The service definition can be retrieved by querying a data source that includes the service definition. For example, the target service itself may include functionality allowing the proxy service to query the target service for the associated service definition. As another example, the proxy service may query a database using a target service identifier or read configuration data associated with the target service to retrieve the associated service definition.

After the proxy service retrieves the service definition associated with the target service, the proxy service implements the service definition (block 408). The particular operations performed by the proxy service can vary depending on the implementation. For example, in some implementations, the proxy service may instantiate various components, such as a validator, one or more encoder/decoders, or one or more service protocol interfaces. Once the proxy service implements the service definition, the process ends.

If the proxy service determined that the target service does not exist (block 404), the proxy service generates and sends an error response indicating that the proxy service does not exist (block 410). The particular operations performed to generate and send the error response can be similar to those described at blocks 214, 216, and 218 of FIG. 2. As described above, in some implementations, the proxy service may indicate an error implicitly by not sending any response. Once the proxy service has generated and sent the error response, the process ends.

Service Identification and Validation

As described above, there are scenarios in which a proxy service may validate whether a target service exists (e.g., validation of data received from a client or when dynamically implementing a service definition). If the proxy service did not validate the existence of the target service, the data may be forwarded along the network until it reaches another component that determines that the target service does not exist. For example, if a particular application server generally hosts target services, data destined for an invalid target service may be sent to the application server, which would then determine that the target service did not exist. By making the determination at the proxy service, the invalid data does not increase the network load between the proxy service and the application server and reduces the computational load on the application server. Various techniques can be used to validate the existence of a target service.

Generally, a target service exists at a given endpoint and can be identified by an endpoint identifier, such as a URL, an IP address and port number, etc. However, the endpoint identifier may not be sufficient to identify whether a particular version of the target service exists at the endpoint. For example, an endpoint identifier may remain static when a target service is upgraded to a new version, thus not requiring configuration updates to be made at every client that uses the target service. However, some functionality may change between versions. Thus, a determination that a target service exists at a given endpoint may be insufficient to determine whether the data is directed to a valid target service (e.g., the target service may exist, but may be a version that is incompatible with data received from a client). Thus, validating whether a particular target service exists may be done by validating whether functionality requested by a client (e.g., specified in data received by the proxy service from the client) exists.

To validate the existence of a target service and/or functionality associated with the target service, each target service can register functionality provided by the target service. In particular, when a target service is initialized, the target service inserts the functions and arguments associated with the functions into a dictionary. The dictionary can be arranged as a list or table that is searched to identify whether functionality associated with a target service exists.

The dictionary can be further optimized by storing the functionality as a prefix tree (sometimes referred to as a trie or radix tree). For example, assume a target service is located at the URL "http://service.example.com" and includes a function "updatePerson" that takes three parameters, "firstName", "lastName", and "phoneNum". When initialized, the target service may register the URL, the function name, and the three parameter names. The component managing the dictionary may concatenate the URL, the function name, and the parameters and insert the result into a prefix tree or use a hash function to generate a hash value based on the URL, function name, and parameters. Thus the functionality can be identified by traversing the prefix tree instead of searching a list.

Additionally, the dictionary can include a hash-based data structure to quickly determine whether the functionality does not exist or may exist. For example, the dictionary can include a hash table that utilizes cuckoo hashing or a Bloom filter. In both cuckoo hashing or Bloom filters, data is hashed using multiple hash functions. The result of each hash function identifies a location in a hash table (for cuckoo hashing) or a bit array (for Bloom filters). If an expected value is not found in the locations identified by the hash functions, then the data does not exist. If the expected values are found in each of the locations, then the functionality may exist (but may not be guaranteed). Thus, the hash-based data structures can be used to quickly identify target services and target service functionality that does not exist.

Figure 5:
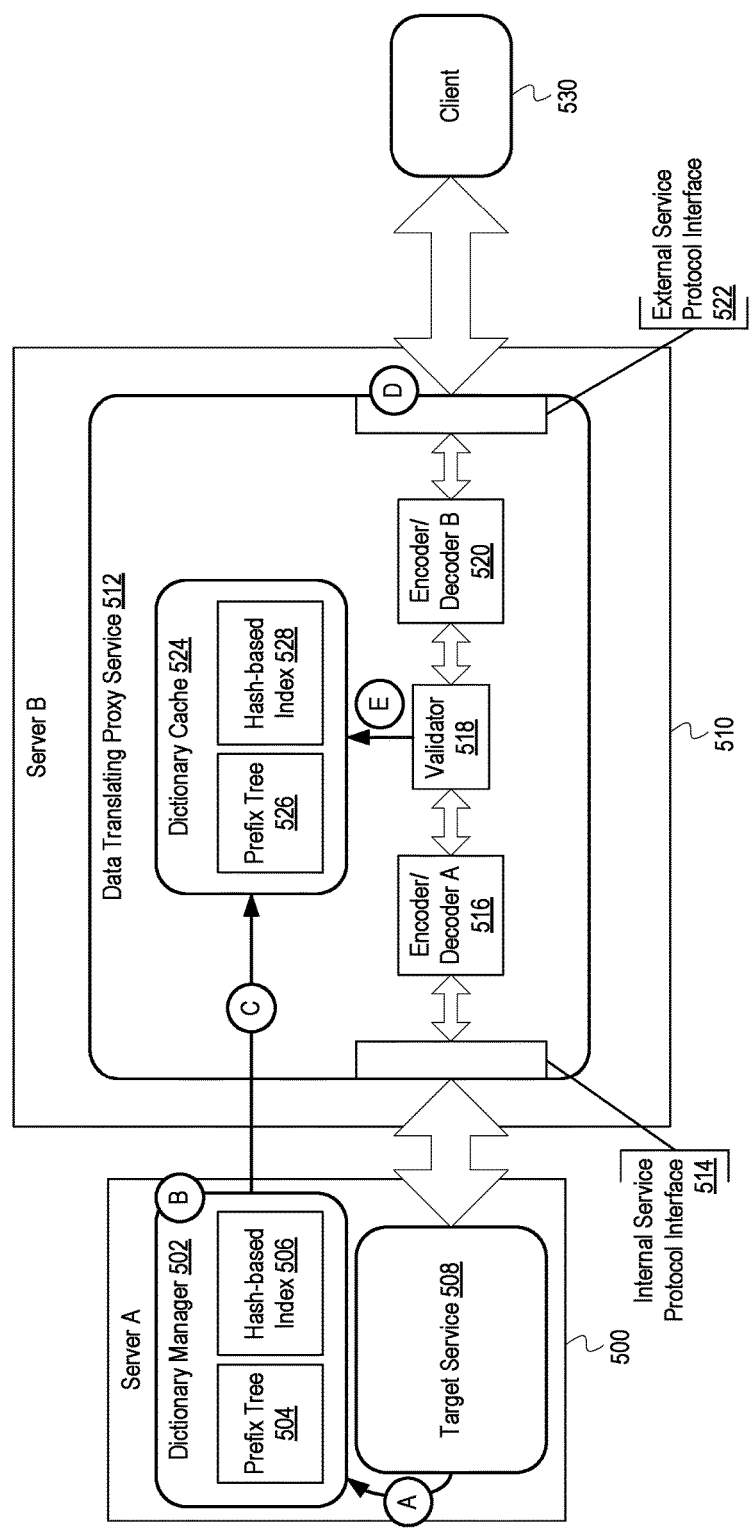
FIG. 5 depicts the operation of an example proxy service validating a target service using a dictionary.

FIG. 5 depicts the operation of an example proxy service validating a target service using a dictionary. FIG. 5 depicts server A 500, server B 510, and a client 530. Server A 500 includes a dictionary manager 502 and a target service 508. The dictionary manager 502 includes two data structures, a prefix tree 504 and a hash-based index 506. Server B 510 includes a proxy service 512, encoder/decoder A 516, validator 518, encoder/decoder B 520, and a dictionary cache 524. The dictionary cache 524 includes a prefix tree 526 and a hash-based index 528.

At stage A, the target service 508 registers functionality with the dictionary manager 502. To register functionality with the dictionary manager 502, the target service 508 can indicate the functionality (e.g., using a function or operation name) and any associated parameters to the dictionary manager 502 via a function call, inter-process communication, an API call, etc.

At stage B, the dictionary manager 502 inserts the indication of the functionality and associated parameters (hereinafter "indication of functionality) into the prefix tree 504 and updates the hash-based index 506 to reflect the indication of functionality. The particular operations performed to update the hash-based index 506 can vary depending on the data structure used for the hash-based index 506. For example, the operations to update a hash table utilizing cuckoo hashing may differ from the operations to update a Bloom filter or a hash database. The indication of functionality can vary but may include an identifier of the target service 508 (e.g., name, endpoint identifier, etc.), a function or operation name, parameter names, return type, etc.

At stage C, the dictionary cache 524 is updated to include the most recent prefix tree 504 and hash-based index 506. The dictionary cache 524 can be updated in response to the dictionary manager 502 updating the prefix tree 526 and hash-based index 528, when requested by the proxy service 512, or periodically.

At stage D, the proxy service 512 receives data from the client 530 that identifies the target service 508 and functionality associated with the target service 508. When the proxy service 512 receives the data from the client 530, the proxy service 512 can perform operations similar to those described above at stages B and C of FIG. 1.

At stage E, the validator 518 validates the target service functionality using the dictionary cache 524. To validate the target service functionality, the validator 518 passes an indication of the functionality (e.g., a target service identifier, function name, and parameter names) to the dictionary cache 524. The dictionary cache 524 determines whether the hash-based index 528 indicates that the functionality does not exist or may exist. If the hash-based index 528 indicates that the functionality does not exist, the dictionary cache 524 indicates to the validator 518 that the functionality does not exist. If the hash-based index 528 indicates that the functionality may exist, the dictionary cache 524 determines whether the functionality exists by determining whether an indication of the functionality exists in the prefix tree 526. The dictionary cache 524 then indicates to the validator 518 whether the functionality exists or does not exist.

If the validator 518 determines that the functionality does not exist, the validator 518 can generate an error response as described above in relation to FIG. 1 (e.g., at stages E and F). If the validator 518 determines that the functionality does exist, the proxy service 512 can perform the operations described above at stages G and H of FIG. 1.

Although the dictionary manager 502 is depicted as being part of server A 500 along with the target service 508, the dictionary manager 502 can run on hardware independent from the target service 508. Further, the dictionary manager 502 can operate as part of server B 510 or the proxy service 512, possibly in place of the dictionary cache 524. In some implementations, the proxy service 512 may validate the target service functionality directly with the dictionary manager 502 instead of using the dictionary cache 524. Additionally, although FIG. 5 depicts the dictionary cache 524 as being a module that performs the operations to validate the functionality, the proxy service 524 may perform the operations using the prefix tree 526 and hash-based index 528 directly.

Figure 6:
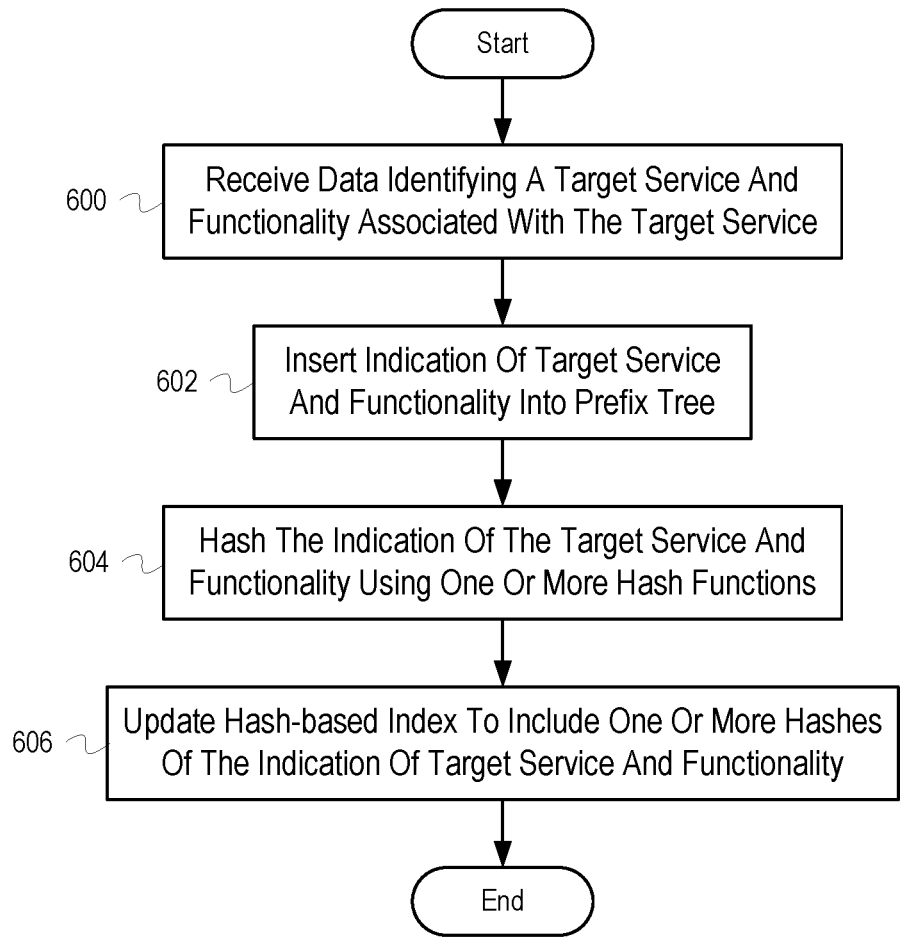
FIG. 6 depicts a flowchart of example operations for adding target service functionality to a dictionary.

FIG. 6 depicts a flowchart of example operations for adding target service functionality to a dictionary. The operations depicted in FIG. 6 can be performed by a dictionary manager, such as the dictionary manager 502 of FIG. 5, or any suitable component.

Initially, a dictionary manager receives data identifying a target service and functionality associated with the target service (block 600). The data can include a target service identifier (e.g., a URL, IP address, etc.), a function or operation identifier, and parameter identifiers.

After receiving the data identifying the target service and functionality associated with the target service, the dictionary manager inserts an indication of the target service and the functionality into a prefix tree (block 602). The indication of the target service and the functionality can be generated based, at least in part, on the data identifying the target service and the functionality. For example, the dictionary manager may generate an integer hash based on a target service identifier, a function identifier, and parameter identifiers and insert the integer hash into the prefix tree.

The dictionary manager also hashes the indication of the target service and the functionality using one or more hash functions (block 604). The particular hash functions used can vary based, at least in part, on the implementation of a hash-based index used by the proxy service (or associated dictionary manager). For example, if the hash-based index is a hash database, the indication of the target service and the functionality may be hashed once using a single hash function. If the hash-based index is a Bloom filter, the indication of the target service and the functionality may be hashed using multiple hash functions to generate multiple hashes.

After hashing the indication of the target service and the functionality, the dictionary manager updates a hash-based index to include hashes of the indication of the target service and the functionality (block 606). The particular operations performed can vary depending on the particular hash-based index implementation. For example, if the hash-based index is a Bloom filter, the dictionary manager may set bits of a bit array that are each identified by one of a plurality of hash functions to a particular value. If the hash-based index is a hash database, the dictionary manager may insert a hash generated based, at least in part, on the target service and the functionality into the hash database. After the hash-based index is updated, the process ends.

Figure 7:
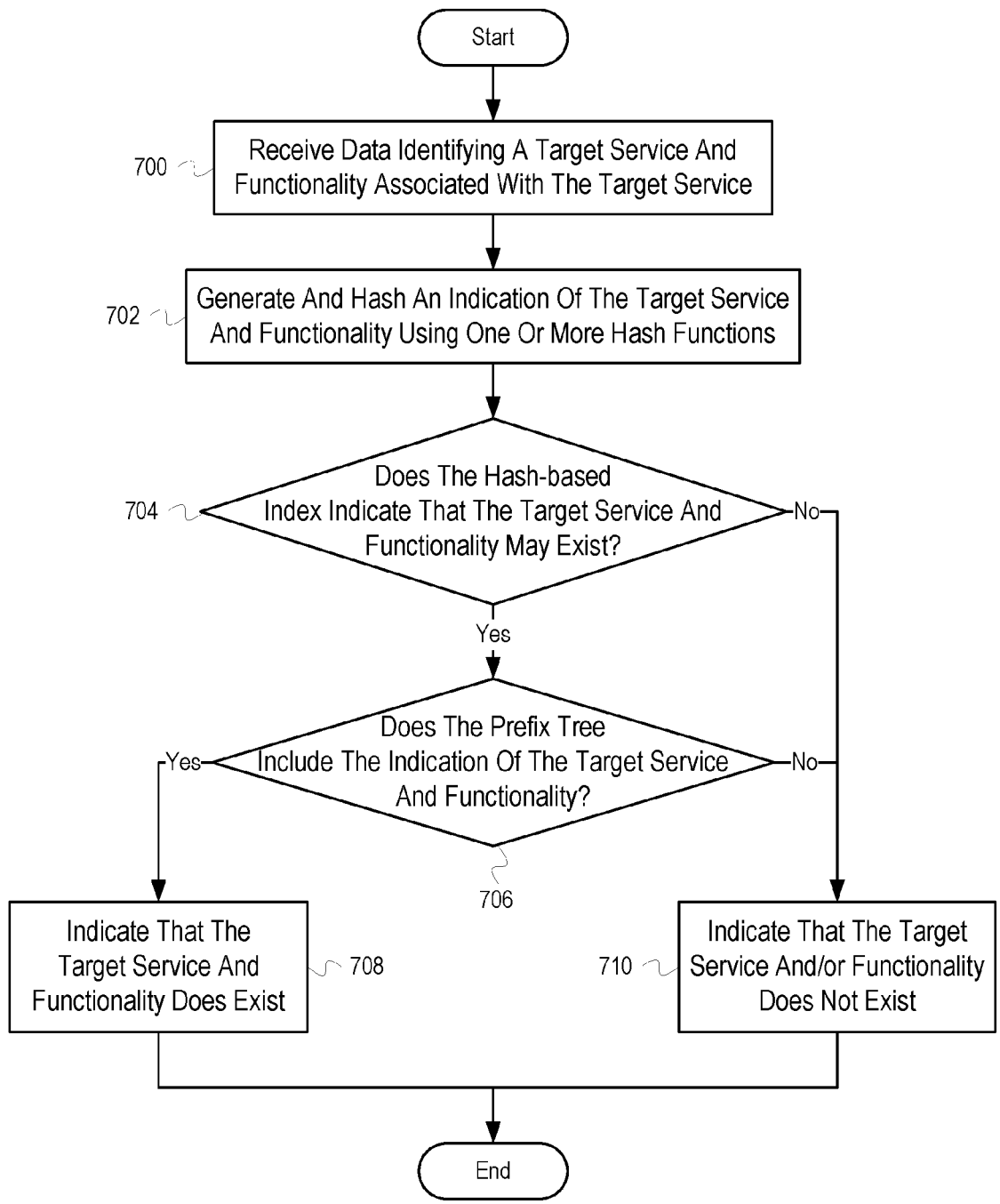
FIG. 7 depicts a flowchart of example operations for validating target service functionality.

FIG. 7 depicts a flowchart of example operations for validating target service functionality. The operations depicted in FIG. 7 can be performed by a proxy service, such as the proxy service 512 of FIG. 5, or any suitable component.

Initially, a proxy service receives data identifying a target service and functionality associated with the target service (block 700). The data can include a target service identifier (e.g., a URL, IP address, etc.), a function or operation identifier, and parameter identifiers.

After receiving the data identifying the target service and the functionality associated with the target service, the proxy service generates and hashes an indication of the target service and the functionality using one or more hash functions (block 702). The particular hash functions used can vary based, at least in part, on the implementation of a hash-based index used by the proxy service (or associated dictionary manager). For example, if the hash-based index is a hash database, the indication of the target service and the functionality may be hashed once using a single hash function. If the hash-based index is a Bloom filter, the indication of the target service and the functionality may be hashed using multiple hash functions to generate multiple hashes. The indication of the target service and the functionality can be generated based, at least in part, on the data identifying the target service and the functionality.

After hashing the indication of the target service and the functionality, the proxy service determines whether the hash-based index indicates that the target service and functionality may exist (block 704). The particular operations performed to determine whether the hash-based index indicates that the target service and functionality may exist can vary depending on the hash-based index implementation. For example, if a hash database is used, the hash database may be searched to determine if the hash exists in the hash database. If a Bloom filter is used, the proxy service may determine whether particular bits of an array of bits identified by the hashes are set to a particular value. If the hash-based index indicates that the target service and functionality may exist, control flows to block 706. If the hash-based index indicates that the target service and functionality does not exist, control flows to block 710.

If the proxy service determined that the hash-based index indicates that the target service and functionality may exist, the proxy service determines whether a prefix tree includes the indication of the target service and the functionality (block 706). To determine whether the prefix tree includes the indication of the target service and the functionality, the proxy service traverses the prefix tree using the indication of the target service and the functionality. If the proxy service determines that the prefix tree includes the indication of the target service and the functionality, control flows to block 708. If the proxy service determines that the prefix tree does not include the indication of the target service and the functionality, control flows to block 710.

If the proxy service determined that the prefix tree includes the indication of the target service and the functionality, the proxy service indicates that the target service and functionality exists (block 708). After the proxy service indicates that the target service and functionality exists, the process ends.

If the proxy service determined that the hash-based index indicates that the target service and functionality does not exist (block 704) or that the prefix tree does not include the indication of the target service and the functionality (block 706), the proxy service indicates that the target service and/or functionality does not exist (block 710). After the proxy service indicates that the target service and functionality does not exist, the process ends.

As indicated above, the use of a prefix tree and/or hash-based index is optional. For example, the dictionary may consist of a list of indications of target services and associated functionality.

Additionally, it should be noted that the operations depicted in FIGS. 5 through 7 also serve to validate whether data conforms to a service definition (at least partly). For example, a service definition may define the valid functionality (e.g., operations) available as well as the associated parameters. Thus, the operations depicted in FIGS. 5 through 7 can be used to validate a service definition in addition to validating whether a target service exists. However, other operations may be performed in addition to, or instead of, the operations depicted in FIGS. 5 through 7 to validate whether data conforms to a particular service definition. For example, a proxy service may determine whether parameter values are of a correct type, meet certain criteria, etc. In some instances, however, the operations depicted in FIGS. 5 through 7 may be modified to allow for validation of any aspect of the service definition. For example, the indication of the target service and the associated functionality can include an interpretable representation of the criteria that applies to a particular parameter.

Although the examples herein depict communications between a client and a target service, the examples can be adapted for other forms of communications as well. For example, a proxy service can be used to translate messages that conform to a first messaging protocol into messages that conform to a second messaging protocol (and vice versa). Thus, a proxy service can be utilized to act as a bridge or gateway between a variety of systems that utilize disparate communications techniques (e.g., different encoding/serialization techniques, formats, transport layers, etc.).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
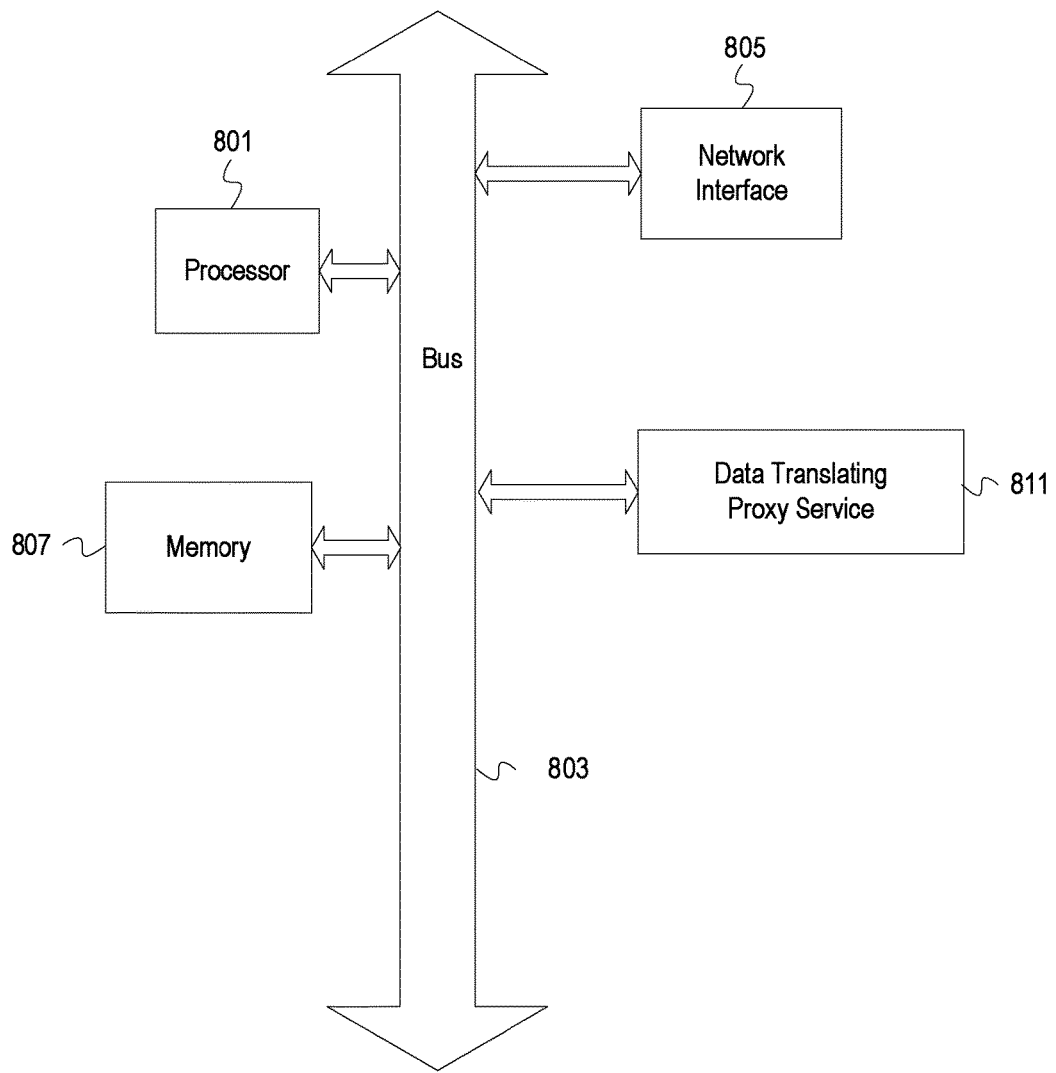
FIG. 8 depicts an example computer system with a proxy service.

FIG. 8 depicts an example computer system with a proxy service. The computer system includes a processor 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, Hyper-Transport® bus, InfiniBand® bus, NuBus, etc.) and a network interface 805 (e.g., a Fiber Channel interface, an Ethernet interface, an internet small computer system interface, SONET interface, wireless interface, etc.). The system also includes a proxy service 811. The proxy service 811 receives data encoded using a first encoding technique and translates the data into data using a second encoding technique. The proxy service 811 then sends the data encoded using the second encoding technique to a target service or target component (e.g., a client). The proxy service 811 may decode the data encoded using the first encoding technique into a transitional format prior to encoding the data using the second encoding technique. The proxy service 811 may also validate the data prior to encoding the data using the second encoding technique. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for translating data for services as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   receiving, by a proxy service, first data from a source component, wherein the first data is encoded in accordance with a first encoding technique;
   determining that the first data is valid based, at least in part, on a service definition associated with a target component; and
   in response to determining that the first data is valid,
   generating, by the proxy service, second data based, at least in part, on the first data, wherein the second data is encoded in accordance with a second encoding technique; and
   sending the second data to the target component.

2. The method of claim 1, wherein the target component is a service, the method further comprising:
   determining, by the proxy service, that the proxy service does not implement the service definition associated with the target component;
   in response to determining that the proxy service does not implement the service definition, determining, by the proxy service, the service definition; and
   in response to determining the service definition, implementing the service definition;
   wherein determining whether the first data is valid is in response to implementing the service definition.

3. The method of claim 1, further comprising:
   receiving, by the proxy service, third data from the source component, wherein the third data is encoded in accordance with the first encoding technique;
   determining that the third data is not valid based, at least in part, on the service definition associated with the target component; and
   in response to determining that the third data is not valid, generating an error response;
   encoding the error response in accordance with the first encoding technique; and
   sending the encoded error response to the source component.

4. The method of claim 1, wherein determining that the first data is valid comprises:
   determining that a target service identified by the first data is a valid target service; and
   determining that the first data conforms to the service definition, wherein the proxy service implements the service definition.

5. The method of claim 1, wherein determining that the first data is valid comprises:
   identifying a target component identifier and an operation identifier based, at least in part, on the first data;
   generating a first indication comprising the target component identifier and the operation identifier; and
   determining that the first indication is in a data structure comprising a plurality of indications, wherein a determination that the first indication is in the data structure comprises a determination that the first data is valid.

6. The method of claim 5, further comprising:
   receiving the target component identifier and the operation identifier;
   generating a second indication comprising the target component identifier and the operation identifier; and
   inserting the second indication into the data structure.

7. The method of claim 1, wherein sending the second data to the target component comprises sending the second data from a first computing system to a second computing system, wherein the proxy service is located on the first computing system and the target component is located on the second computing system.

8. The method of claim 1, wherein receiving the first data comprises receiving the first data via a first network, wherein sending the second data comprises sending the second data via a second network.

9. One or more machine readable storage media having program code stored therein, the program code comprising instructions to:
receive, from a client, a first message, wherein the first message is encoded in accordance with a first protocol, wherein the first message comprises a request to perform an operation defined in a service definition, wherein the request to perform the operation comprises a first parameter;
identify a target service associated with the first message;
determine whether the first message is valid based, at least in part, on the service definition;
in response to a determination that the first message is valid, generate a second message based, at least in part, on the first message, wherein the second message is encoded in accordance with a second protocol; and
send the second message to the target service.

10. The machine readable storage media of claim 9, wherein the first message comprises a request to perform an operation and a parameter associated with the operation, wherein the operation and the parameter are defined in a service definition implemented by the target service.

11. The machine readable storage media of claim 10, wherein the instructions to determine whether the first message is valid comprise instructions to:
determine that the target service is a valid target service;
determine that the operation is defined in the service definition; and
determine that the parameter conforms to the service definition.

12. The machine readable storage media of claim 10, wherein the instructions to determine whether the first message is valid comprise instructions to:
generate an indication comprising at least one of a target service identifier corresponding to the target service, an operation identifier corresponding to the operation, and a parameter identifier corresponding to the parameter;
determine whether a hash-based index structure indicates that the first message may be valid based, at least in part, on the indication; and
in response to a determination that the hash-based index structure indicates that the first message may be valid, determine whether a prefix tree includes the indication.

13. The machine readable storage media of claim 9, wherein the program code further comprises instructions to:
in response to a determination that the first message is not valid, generate a third message, wherein the third message is encoded in accordance with the first protocol; and
send the third message to the client.

14. The machine readable storage media of claim 9, wherein the program code further comprises instructions to:
receive, from the target service, a third message, wherein the third message is encoded in accordance with the second protocol;
generate a fourth message based, at least in part, on the third message, wherein the fourth message is encoded in accordance with the first protocol; and
send the fourth message to the target service.

15. A system comprising:
a first computing system comprising,
a first processor; and
a first machine readable medium having program code executable by the first processor to cause the first computing system to,
determine that first data has been received, wherein the first data has been serialized using a first serialization technique;
unserialize the first data into second data;
determine whether a target service specified by the second data is valid;
determine whether the second data conforms to a service definition implemented by the target service;
in response to a determination that the target service is valid and a determination that the second data conforms to the service definition, serialize the second data into third data, wherein the third data is serialized using a second serialization technique; and
send the third data to the target service.

16. The system of claim 15, further comprising:
a second computing system comprising,
a second processor; and
a second machine readable medium having program code executable by the second processor to cause the second computing system to, determine that the third data has been received;
unserialize the third data into fourth data; and
perform an operation identified by the fourth data.

17. The system of claim 16, wherein the first data is received from a client, wherein the first computing system comprises a gateway between a network comprising the client and a network comprising the second computing system.

18. The system of claim 15, wherein the first machine readable medium further comprises program code executable by the first processor to cause the first computing system to:
determine that fourth data has been received, wherein the fourth data has been serialized using the second serialization technique;
unserialize the fourth data into fifth data;
determine a client component specified by the fifth data;
serialize the fifth data into sixth data, wherein the sixth data is serialized using the first serialization technique; and
send the sixth data to the client component.

19. The system of claim 15, wherein the first machine readable medium further comprises program code executable by the first processor to cause the first computing system to:
identify the target service based, at least in part, on the first data;
determine that the service definition is not implemented;
retrieve the service definition; and
implement the service definition;
wherein the program code executable by the first processor to cause the first computing system to determine whether the second data conforms to the service definition comprises program code executable by the first process to cause the first computing system to determine whether the second data conforms to the service definition in response to implementing the service definition.

20. The system of claim 15, wherein the second serialization technique is a high performance serialization technique relative to the first serialization technique.

* * * * *